United States Patent
Cezanne et al.

(10) Patent No.: US 11,469,937 B2
(45) Date of Patent: Oct. 11, 2022

(54) LOCATION ENCODING FOR SYNCHRONIZATION SIGNAL TO CONVEY ADDITIONAL INFORMATION

(71) Applicant: QUALCOMM Incorporated, San Diego, CA (US)

(72) Inventors: Juergen Cezanne, Ocean Township, NJ (US); Sundar Subramanian, Bridgewater, NJ (US); Krishna Kiran Mukkavilli, San Diego, CA (US); Muhammad Nazmul Islam, Edison, NJ (US); Junyi Li, Chester, NJ (US)

(73) Assignee: QUALCOMM Incorporated, San Diego, CA (US)

(*) Notice: Subject to any disclaimer, the term of this patent is extended or adjusted under 35 U.S.C. 154(b) by 133 days.

(21) Appl. No.: 15/492,124

(22) Filed: Apr. 20, 2017

(65) Prior Publication Data

US 2017/0353343 A1 Dec. 7, 2017

Related U.S. Application Data

(60) Provisional application No. 62/344,487, filed on Jun. 2, 2016.

(51) Int. Cl.
*H04B 1/7073* (2011.01)
*H04L 5/00* (2006.01)
(Continued)

(52) U.S. Cl.
CPC ....... *H04L 27/2656* (2013.01); *H04B 7/0617* (2013.01); *H04L 5/005* (2013.01);
(Continued)

(58) Field of Classification Search
CPC ........... H04L 27/26136; H04L 27/2656; H04L 27/2613; H04L 27/2692; H04L 5/005;
(Continued)

(56) References Cited

U.S. PATENT DOCUMENTS

| 2007/0183307 A1* | 8/2007 | Akita | H04J 11/0073 370/208 |
| 2008/0209492 A1* | 8/2008 | Matsuura | H04N 7/08 725/117 |

(Continued)

FOREIGN PATENT DOCUMENTS

| WO | WO-2016064315 A1 | 4/2016 | |
| WO | WO-2017018966 A1 * | 2/2017 | .......... H04J 11/0069 |
| WO | WO-2017127181 A1 * | 7/2017 | .......... H04L 27/0006 |

OTHER PUBLICATIONS

International Search Report and Written Opinion—PCT/US2017/028935—ISA/EPO—Sep. 21, 2017.
(Continued)

*Primary Examiner* — Edan Orgad
*Assistant Examiner* — Vanneilian Lalchinthang
(74) *Attorney, Agent, or Firm* — Qualcomm Incorporated

(57) ABSTRACT

Aspects of the present disclosure relate to methods and apparatus for location encoding for secondary synchronization signals (SSS) to convey additional information, such as a current symbol number. According to aspects, a method is provided herein for wireless communications that may be performed, for example, by a base station (BS). The method generally includes selecting frequency resources to use for transmitting synchronization signals in a symbol of a frame, wherein the frequency resources are selected based on a mapping of frequency resources to a location of the symbol within the frame; and transmitting synchronization signals to at least one user equipment (UE) according to the mapping. As a result, the UE may receive synchronization signals, determine a location of the current symbol in a frame based on the mapping, and synchronize to the BS based on the determined location of the current symbol. Numerous other aspects are provided.

30 Claims, 12 Drawing Sheets

(51) Int. Cl.
*H04W 16/14* (2009.01)
*H04L 27/26* (2006.01)
*H04W 56/00* (2009.01)
*H04B 7/06* (2006.01)
*H04W 48/16* (2009.01)
*H04W 72/12* (2009.01)
*H04W 16/32* (2009.01)
*H04W 72/04* (2009.01)

(52) U.S. Cl.
CPC ...... *H04L 27/2613* (2013.01); *H04L 27/2692* (2013.01); *H04W 48/16* (2013.01); *H04W 56/001* (2013.01); *H04W 72/1263* (2013.01); *H04L 5/0023* (2013.01); *H04W 16/32* (2013.01); *H04W 72/0453* (2013.01)

(58) Field of Classification Search
CPC ............. H04L 27/26132; H04L 5/0023; H04L 5/0053; H04L 5/0007; H04L 5/001; H04L 27/0006; H04B 7/0617; H04B 1/7073; H04W 48/16; H04W 56/001; H04W 72/1263; H04W 16/32; H04W 72/0453; H04W 16/14
USPC .......................................................... 370/350
See application file for complete search history.

(56) References Cited

U.S. PATENT DOCUMENTS

| | | | | |
|---|---|---|---|---|
| 2011/0026577 A1* | 2/2011 | Primo | ................. | H04L 25/0212 375/232 |
| 2011/0243075 A1* | 10/2011 | Luo | ..................... | H04W 74/004 370/329 |
| 2014/0198772 A1* | 7/2014 | Baldemair | .......... | H04L 27/2692 370/335 |
| 2014/0342746 A1* | 11/2014 | Nakashima | ........... | H04L 5/0048 455/450 |
| 2016/0112997 A1* | 4/2016 | Chen | ....................... | H04W 4/70 370/329 |
| 2016/0142989 A1* | 5/2016 | Hashemi | .............. | H04J 11/0069 370/350 |
| 2016/0212631 A1* | 7/2016 | Shen | ................... | H04W 56/001 |
| 2016/0277225 A1* | 9/2016 | Frenne | ............. | H04W 56/0015 |
| 2016/0294528 A1* | 10/2016 | Kim | ...................... | H04L 5/0053 |
| 2017/0012753 A1* | 1/2017 | Kim | .................... | H04W 56/002 |
| 2017/0303173 A1* | 10/2017 | Cedergren | ........ | H04W 36/0083 |

OTHER PUBLICATIONS

NEC Group: "Discussion on time and frequency synchronisation for the Additional Carrier type", 3GPP Draft; R1-120247 Discussion on Time-Frequency Synch for Additional Carrier, 3rd Generation Partnership Project (3GPP), Mobile Competence Centre; 650, Route Des Lucioles; F-06921 Sophia-Antipolis Cedex ; France, vol. RAN WG12-13, 15-26, 30-40, 42-52, No. Dresden, Germany, Feb. 6, 2012-Feb. 10, 2012, Jan. 31, 2012 (Jan. 31, 2012), XP050562802.
Samsung et al., "Reference Signal Transmission in DwPTS", 3GPP Draft; R1-080041, 3rd Generation Partnership Project (3GPP), Mobile Competence Centre; 650, Route Des Lucioles; F-06921 Sophia-Antipolis Cedex; France, vol. RAN WG1, No. Sevilla, Spain; Jan. 8, 2008, XP050108584, [retrieved on Jan. 8, 2008], 3 pages.

* cited by examiner

LOCATION ENCODING FOR SYNCHRONIZATION SIGNAL TO CONVEY ADDITIONAL INFORMATION

CROSS-REFERENCE TO RELATED APPLICATION & PRIORITY CLAIM

This application claims benefit of and priority to U.S. Provisional Patent Application Ser. No. 62/344,487, filed Jun. 2, 2016, which is herein incorporated by reference in its entirety for all applicable purposes.

BACKGROUND

Field of the Disclosure

The present disclosure relates generally to wireless communication and, more particularly, to methods and apparatus for location encoding for synchronization signals (e.g., such as a secondary synchronization signal (SSS)) to convey additional information, such as a current symbol number.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by Third Generation Partnership Project (3GPP).

A wireless communication network may include a number of base stations (BS) that can support communication for a number of user equipments (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, access point (AP), radio head, transmit receive point (TRP), new radio (NR) BS, 5G Node B, etc.).

These multiple access technologies have been adopted in various telecommunication standards to provide a common protocol that enables different wireless devices to communicate on a municipal, national, regional, and even global level. New radio (NR), which may also be referred to as 5G, is a set of enhancements to the LTE mobile standard promulgated by Third Generation Partnership Project (3GPP). It is designed to better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in LTE, NR, and 5G technologies. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

The present disclosure relates generally to wireless communication, and more particularly, to methods and apparatus for location encoding for synchronization signals (e.g., such as secondary synchronization signals (SSS)) to convey additional information, such as a current symbol number.

Certain aspects of the present disclosure provide a method for wireless communications that may be performed by a base station (BS). The method generally includes selecting frequency resources to use for transmitting synchronization signals in a symbol of a frame, wherein the frequency resources are selected based on a mapping of frequency resources to a location of the symbol within the frame; and transmitting synchronization signals to at least one user equipment (UE) according to the mapping.

Certain aspects of the present disclosure provide a method for wireless communications that may be performed by a UE. The method generally includes receiving synchronization signals in a current symbol from a BS; determining a mapping of frequency resources used for transmitting the synchronization signals in the current symbol to a location of the current symbol within a frame; determining the location of the current symbol in the frame based on the mapping; and synchronizing to the BS based on the determined location of the current symbol.

Certain aspects of the present disclosure provide an apparatus for wireless communications such as a BS. The apparatus generally includes means for selecting frequency resources to use for transmitting synchronization signals in a symbol of a frame, wherein the frequency resources are selected based on a mapping of frequency resources to a location of the symbol within the subframe; and means for transmitting synchronization signals to at least one UE according to the mapping.

Certain aspects of the present disclosure provide an apparatus for wireless communications such as a UE. The apparatus generally includes means for receiving synchronization signals in a current symbol from a BS; means for determining a mapping of frequency resources used for transmitting the synchronization signals in the current symbol to a location of the current symbol within the frame; means for determining the location of the current symbol in the frame based on the mapping; and means for synchronizing to the BS based on the determined location of the current symbol.

Certain aspects of the present disclosure provide an apparatus for wireless communications such as a BS. The apparatus generally includes at least one processor configured to select frequency resources to use for transmitting synchronization signals in a symbol of a frame, wherein the frequency resources are selected based on a mapping of frequency resources to a location of the symbol within the frame and a transmitter configured to transmit synchronization signals to at least one UE according to the mapping; and a memory coupled with the at least one processor.

Certain aspects of the present disclosure provide an apparatus for wireless communications such as a UE. The apparatus generally includes a receiver configured to receive synchronization signals in a current symbol from a BS; at least one processor configured to determine a mapping of frequency resources used for transmitting the synchronization signals in the current symbol to a location of the current symbol within a frame; determine the location of the current symbol in the frame based on the mapping; and synchronize to the BS based on the determined location of the current symbol; and a memory coupled with the at least one processor.

Certain aspects of the present disclosure provide a computer readable medium having computer executable code stored thereon for wireless communications by a BS. The computer executable code generally includes code for selecting frequency resources to use for transmitting synchronization signals in a symbol of a frame, wherein the frequency resources are selected based on a mapping of frequency resources to a location of the symbol within the frame; and code for transmitting synchronization signals to at least one UE according to the mapping.

Certain aspects of the present disclosure provide a computer readable medium having computer executable code stored thereon for wireless communications by a UE. The computer executable code generally includes code for receiving synchronization signals in a current symbol from a BS; code for determining a mapping of frequency resources used for transmitting the synchronization signals in the current symbol to a location of the current symbol within the frame; code for determining the location of the current symbol in the frame based on the mapping; and code for synchronizing to the BS based on the determined location of the current symbol.

Other aspects, features, and aspects of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects of the invention disclosure herein. In similar fashion, while exemplary aspects may be discussed below as device, system, or method aspects it should be understood that such exemplary aspects can be implemented in various devices, systems, methods, and computer readable media.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
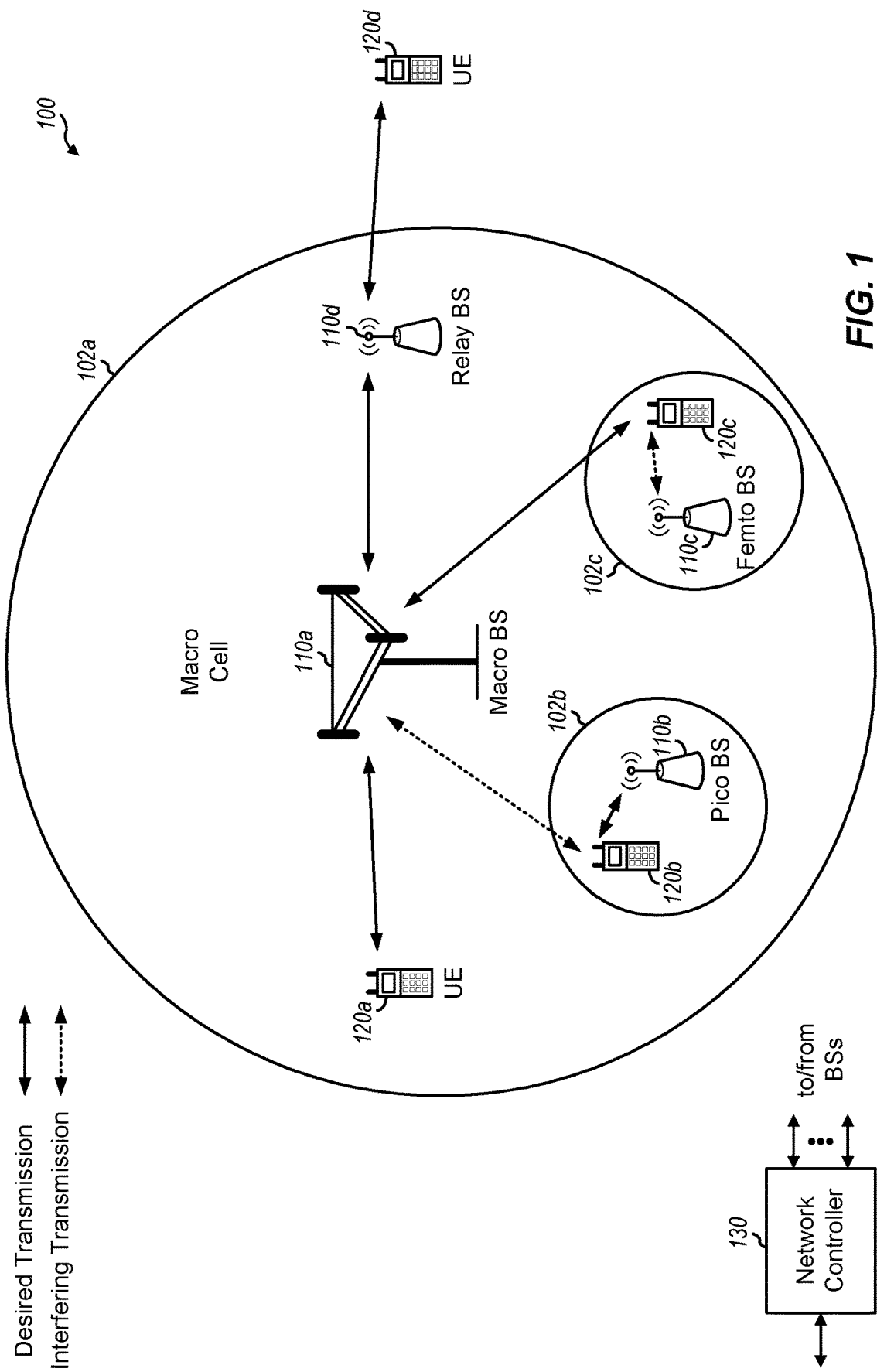
FIG. 1 is a block diagram conceptually illustrating an example of a wireless communication network, in accordance with certain aspects of the present disclosure.

For millimeter wave (mmW) communications, synchronization signals (e.g., PSS and SSS) may be transmitted over additional symbols (e.g., more than two symbols, as typically done in long term evolution (LTE)) so that the signals can be beamformed in multiple directions for multiple UEs to use for synchronization. Therefore, additional information may be needed for the UEs to distinguish in which symbol the PSS/SSS is received.

Aspects of the present disclosure discuss techniques for location encoding for synchronization signals (e.g., such as SSS) to convey additional information, such as a current symbol number. For example, the BS can select frequency resources to use for transmitting synchronization signals in a symbol of a frame (which may include one or more subframes), wherein the frequency resources are selected based on a mapping of frequency resources to a location of the symbol with the frame and transmits the synchronization signals according to the mapping.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspect. Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Node B (NB), gNB, 5G NB, NR BS, Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some implementations, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

An Example Wireless Communication System

FIG. 1 is a diagram illustrating a network architecture 100 in which aspects of the present disclosure may be practiced. For example, the BS 110 (e.g., a Macro eNB) may be configured to perform millimeter wave (mmW) communications with the UEs 102. The BS 110 may send PSS/SSS using beamforming in a plurality of spatial directions, over multiple symbols (e.g., four symbols) to multiple UEs 102. In order to convey information to the UEs 102 to enable the UEs 102 to distinguish which symbol the PSS/SSS is sent in, the BS 110 selecting frequency resources to use for transmitting synchronization signals in a symbol of a frame (which may include one or multiple subframes), wherein the frequency resources are selected based on a mapping of frequency resources to a location of the symbol with the frame and transmit the synchronization signals according to the mapping.

The network 100 may be an LTE network or some other wireless network, such as a 5G or NR network. Wireless network 100 may include a number of BSs 110 and other network entities. A BS is an entity that communicates with user equipments (UEs) and may also be referred to as a base station, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, an BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile base station. In some examples, the base stations may be interconnected to one another and/or to one or more other base stations or network nodes (not shown) in the access network 100 through various types of backhaul interfaces such as a direct physical connection, a virtual network, or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
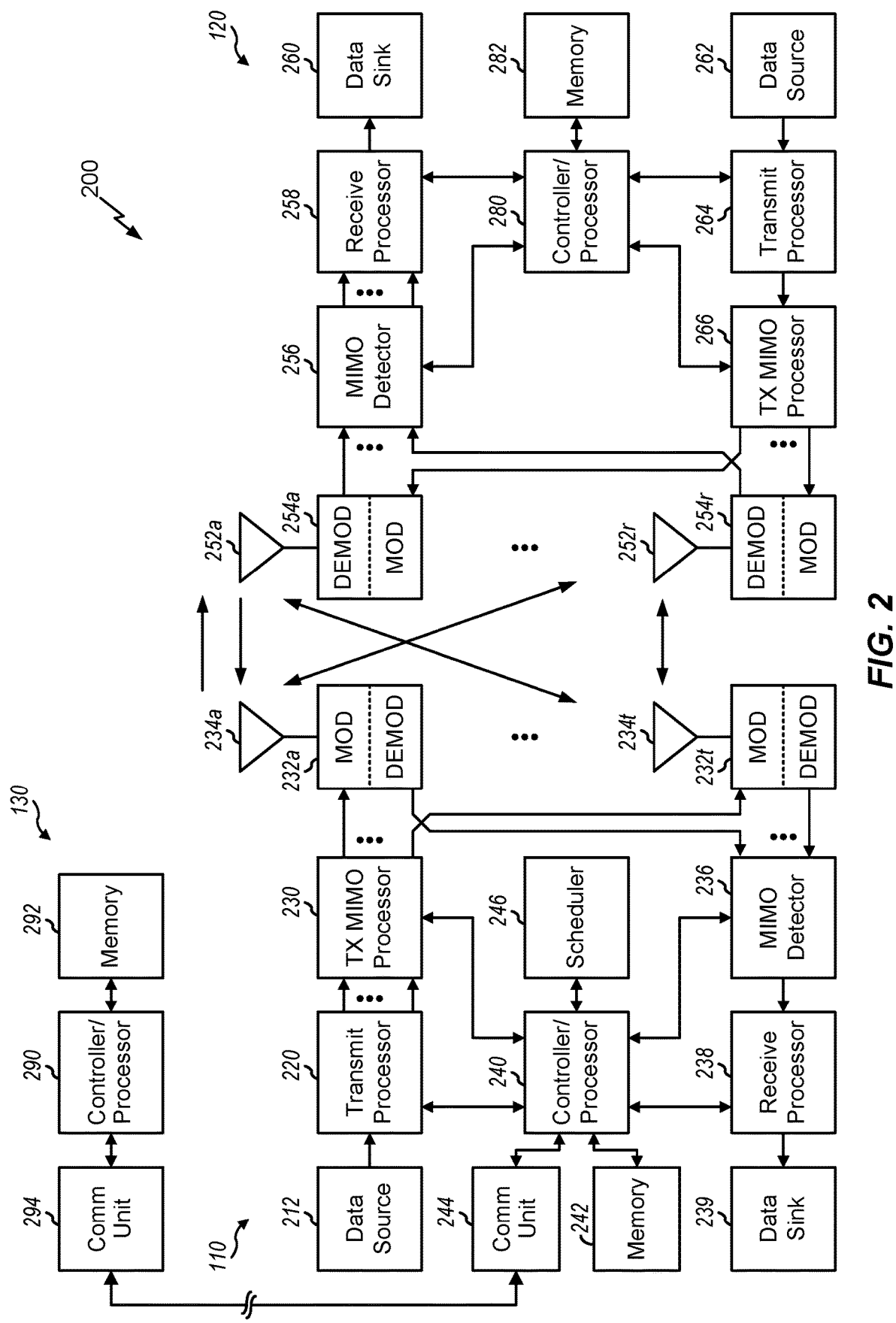
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively, to perform techniques presented herein for location encoding for synchronization signals to convey additional information and a base station. For example, processor 240 and/or other processors and modules at base station 110, and processor 280 and/or other processors and modules at UE 120, may perform or direct operations of base station 110 and UE 120, respectively. For example, controller/processor 280 and/or other controllers/processors and modules at UE 120, and/or controller/processor 240 and/or other controllers/processors and modules at BS 110 may perform or direct operations 900 and 1100 shown in FIGS. 9 and 11, respectively. Memories 242 and 282 may store data and program codes for base station 110 and UE 120, respectively. A scheduler 246 may schedule UEs for data transmission on the downlink and/or uplink.

Figure 3:
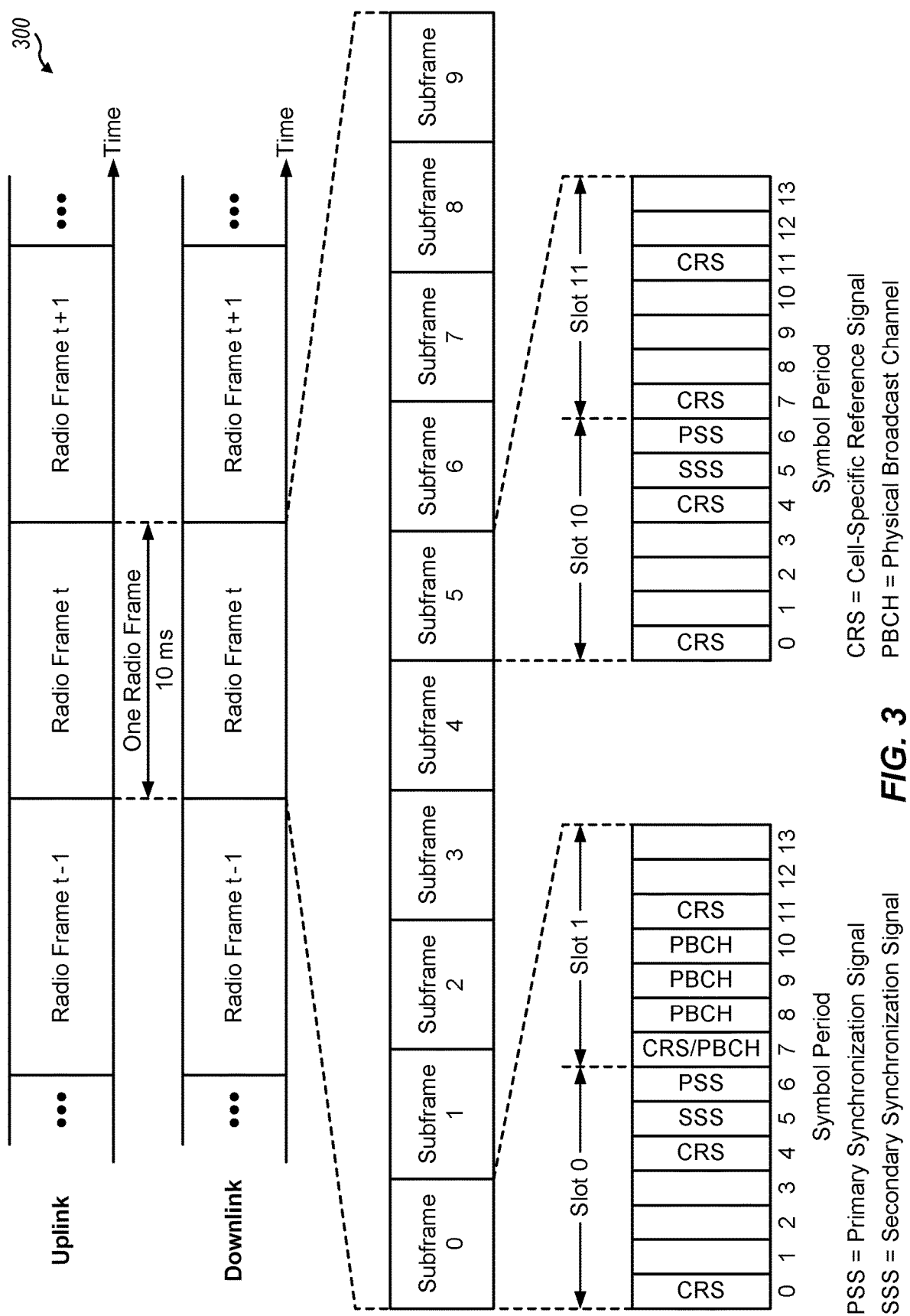
FIG. 3 is a block diagram conceptually illustrating an example of a frame structure in a wireless communications network, in accordance with certain aspects of the present disclosure.

FIG. 3 shows an exemplary frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a BS may transmit these or other signals in these locations or in different locations of the subframe.

Figure 4:
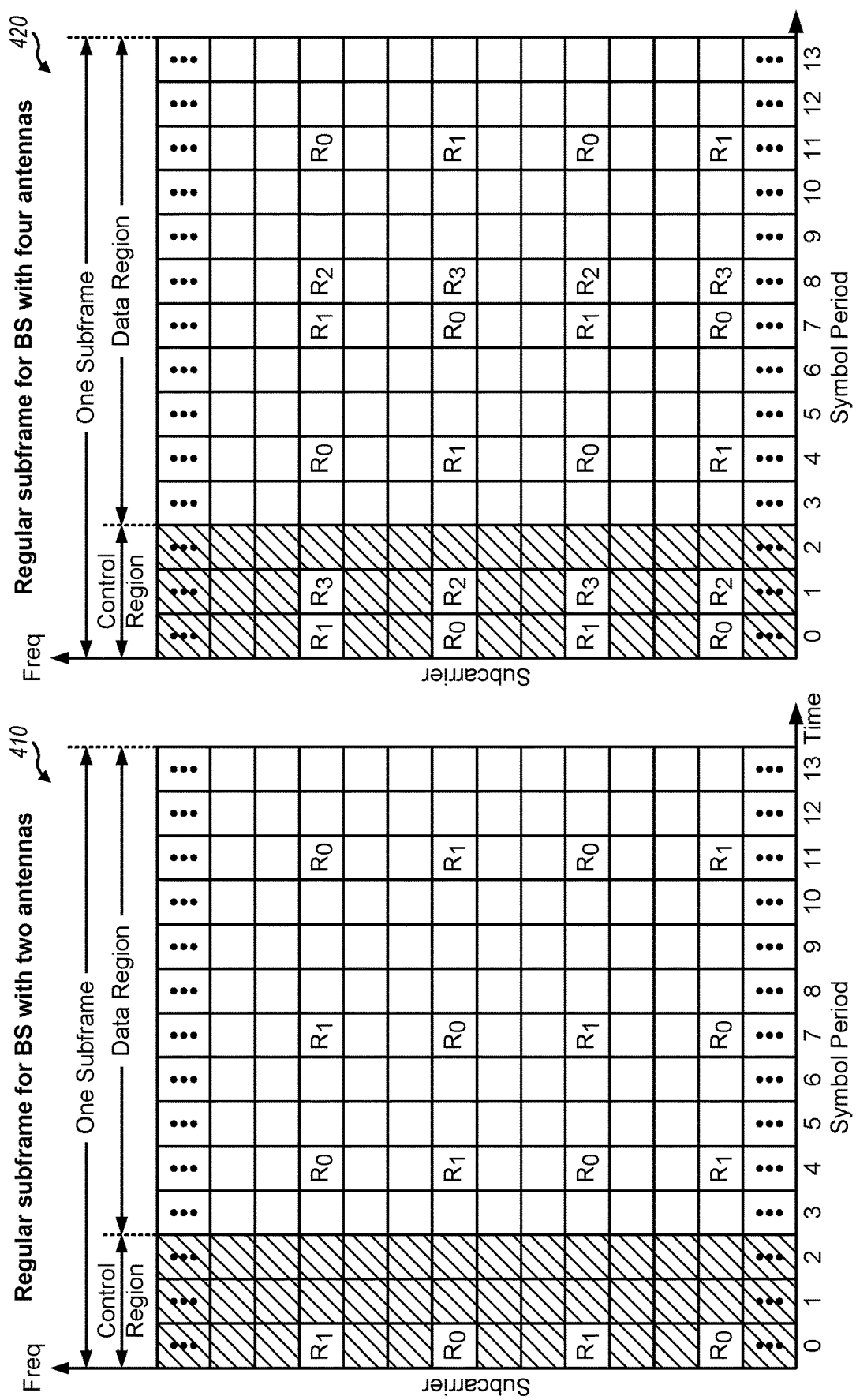
FIG. 4 is a block diagram conceptually illustrating two exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

Example NR/5G RAN Architecture

While aspects of the examples described herein may be associated with LTE technologies, aspects of the present disclosure may be applicable with other wireless communications systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 5:
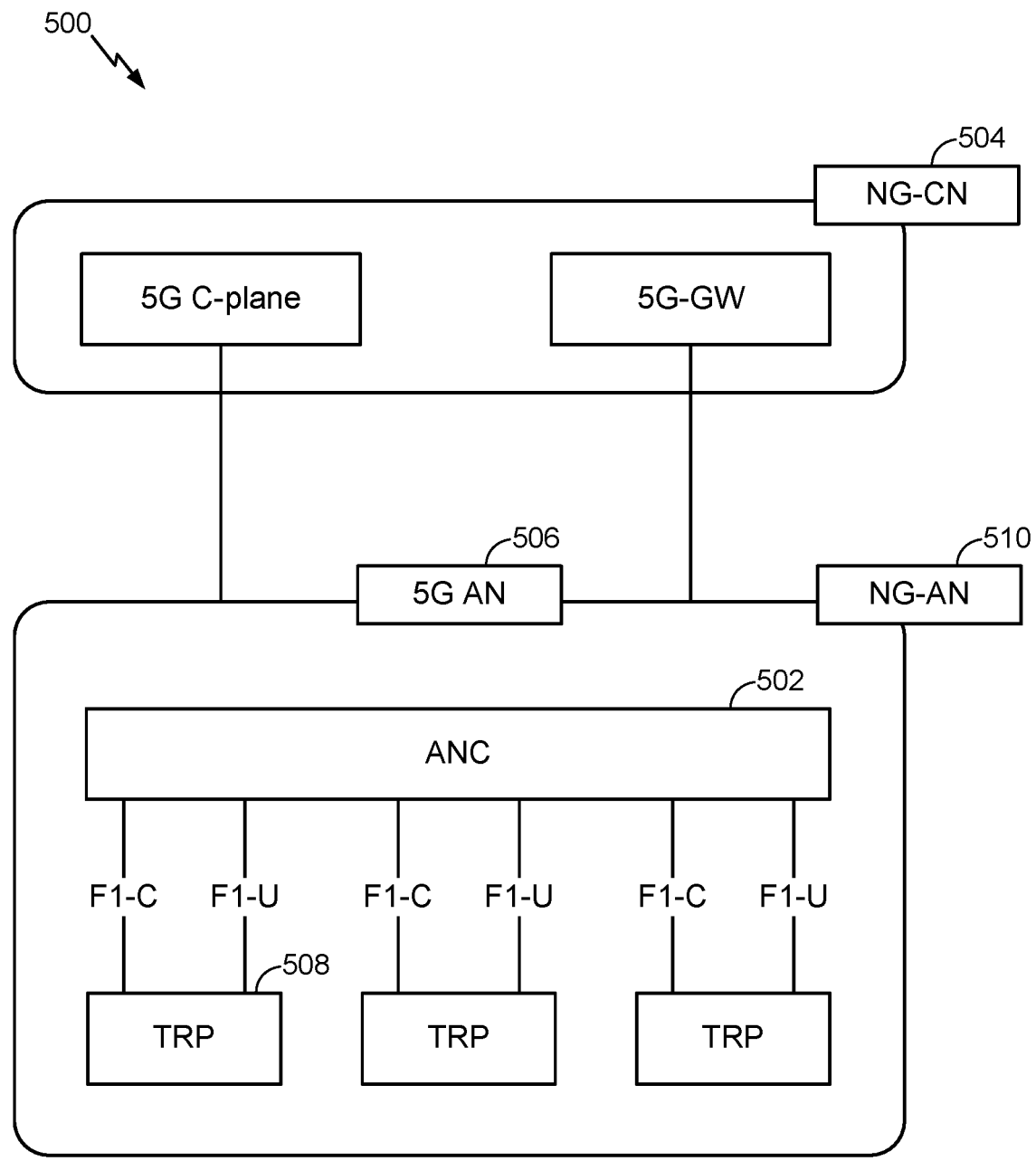
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 500 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture 500. The PDCP, RLC, MAC protocol may be adaptably placed at the ANC or TRP.

According to certain aspects, a BS may include a central unit (CU) (e.g., NC 702) and/or one or more distributed units (e.g., one or more TRPs 508).

Figure 6:
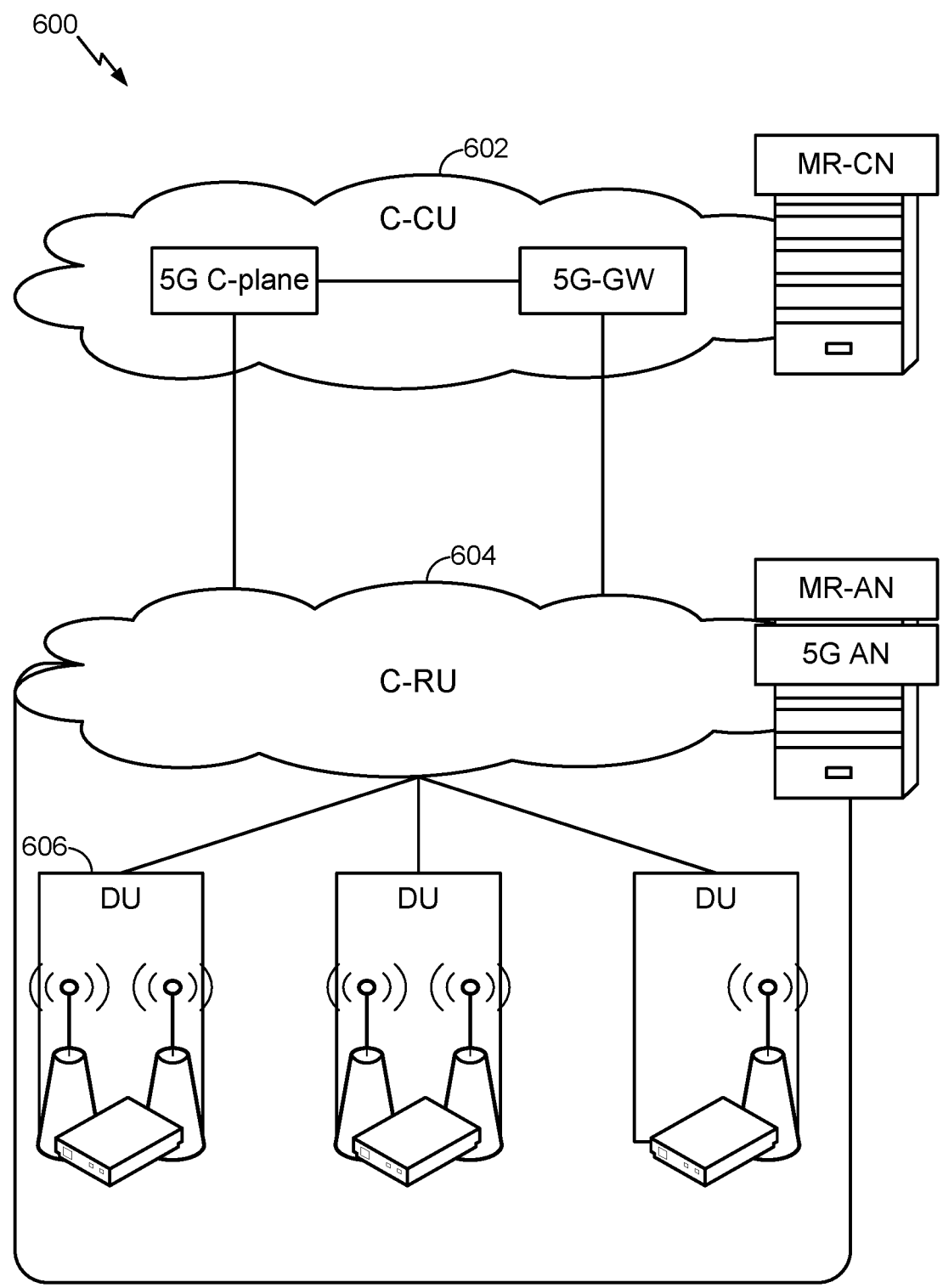
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

Figure 7:
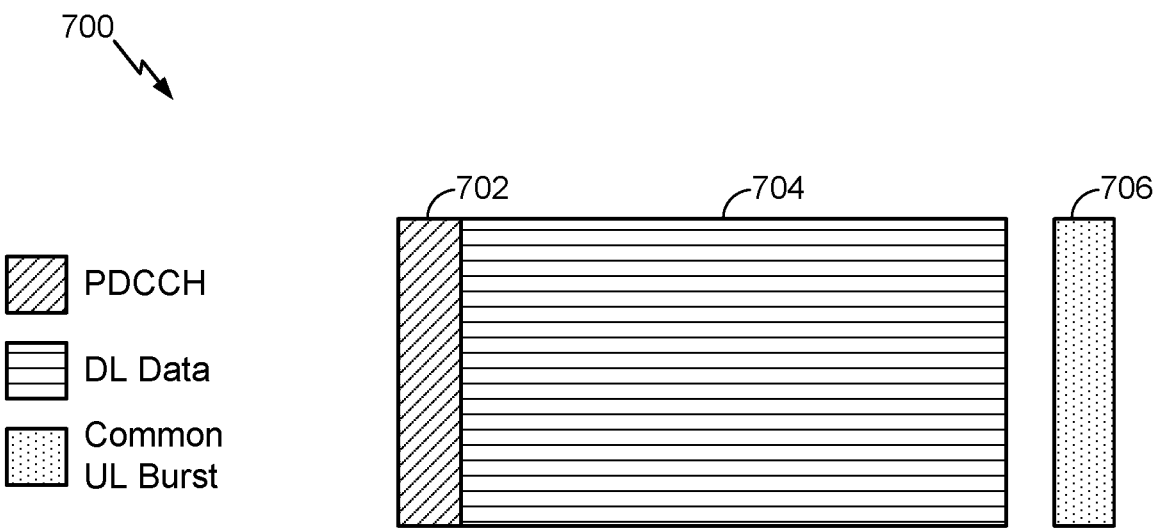
FIG. 7 is a diagram illustrating an example of a downlink (DL)-centric subframe, in accordance with certain aspects of the present disclosure.

FIG. 7 is a diagram 700 showing an example of a DL-centric subframe. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include a common UL portion 706. The common UL portion 706 may sometimes be referred to as an UL burst, a common UL burst, and/or various other suitable terms. The common UL portion 706 may include feedback information corresponding to various other portions of the DL-centric subframe. For example, the common UL portion 706 may include feedback information corresponding to the control portion 706. Non-limiting examples of feedback information may include an ACK signal, a NACK signal, a HARQ indicator, and/or various other suitable types of information. The common UL portion 706 may include additional or alternative information, such as information pertaining to random access channel (RACH) procedures, scheduling requests (SRs), and various other suitable types of information. As illustrated in FIG. 7, the end of the DL data portion 706 may be separated in time from the beginning of the common UL portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 8:
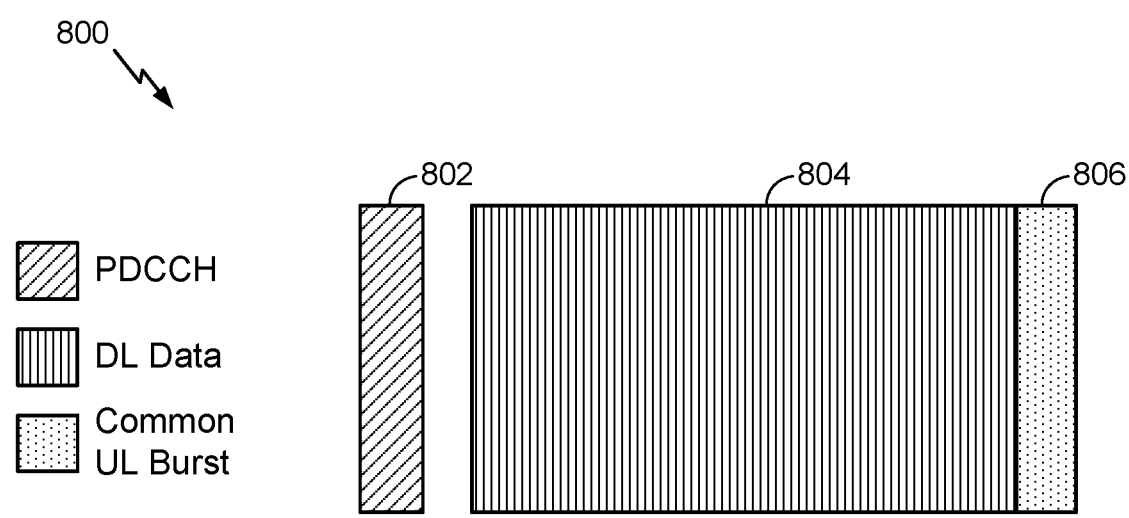
FIG. 8 is a diagram illustrating an example of an uplink (UL)-centric subframe, in accordance with certain aspects of the present disclosure.

FIG. 8 is a diagram 800 showing an example of an UL-centric subframe. The UL-centric subframe may include a control portion 802. The control portion 802 may exist in the initial or beginning portion of the UL-centric subframe. The control portion 802 in FIG. 8 may be similar to the control portion 802 described above with reference to FIG. 8. The UL-centric subframe may also include an UL data portion 804. The UL data portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical UL shared channel (PUSCH).

As illustrated in FIG. 8, the end of the control portion 802 may be separated in time from the beginning of the UL data portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 806. The common UL portion 806 in FIG. 8 may be similar to the common UL portion 806 described above with reference to FIG. 8. The common UL portion 806 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example Location Encoding for Synchronization Signal to Convey Additional Information Certain systems may support millimeter wave (mmW) communications. mmW may refer to communications in the 30-300 GHz bandwidth (also referred to as extremely high frequency (EHF)). For normal cyclic prefix (CP), mmW communications may use a 75 kHz subcarrier spacing, a symbol duration w/o CP of 13.33 μsec, CP length of 0.956 μsec, CP overhead of 6.7%, symbol duration of 14.29 μsec, occupied bandwidth of 90*8 MHz, a guard band of 10*8 MHz, 1200*8 usable subcarriers, 2048*8 fast Fourier transform (FFT) size, and a sampling frequency of 153.6*8 MS/s. However, these parameters are merely exemplary and other parameters may be used for mmW communications.

In a mmW airlink, primary synchronization signals (PSS) and secondary synchronization signals (SSS) may be used to synchronize a user equipment (UE) to the timing of the base station (BS). mmW airlinks may have high pathloss. To overcome the pathloss, the BS transmits PSS/SSS on antenna ports that radiate with a focused beam (e.g., using beamforming). Since all UEs of the cell can benefit from the PSS/SSS signals, the BS may transmit the PSS/SSS during several symbols within a subframe with the antenna beam pointing in a different direction each time until all relevant spatial directions are covered.

In certain systems, (e.g., long term evolution (LTE)) systems, two symbols within the radio frame carry PSS/SSS, for example, as shown in FIG. 3 (e.g., with PSS in symbol 6 of slot 0 in subframe 0 and in symbol 6 of slot 10 in subframe 5 and with SSS in symbol 5 of slot 0 in subframe 0 and in symbol 5 of slot 10 in subframe 5). The SSS may contain information that allows the UE receiving the SSS to distinguish between the two symbols (e.g., and know where it is in the frame). In mmW, PSS/SSS may be sent on a greater number of symbols within the radio frame (e.g., so the BS can transmit the PSS/SSS in all the relevant spatial directions).

Accordingly, techniques and apparatus for the PSS/SSS to indicate additional information are desirable to enable the UE to distinguish between all of the symbols on which the signals may be sent.

Aspects of the present disclosure discuss techniques for location encoding for synchronization signals (e.g., such as SSS) to convey additional information, such as a current symbol number.

The synchronization signal may convey both cell ID and subframe timing (for standalone operation, an indication of logical symbol number 0 . . . 3 may be conveyed as well).

According to certain aspects, certain time-frequency resources of a single or several synchronization subframes may be guaranteed, for example, PSS/SSS may not be replaced by other contents. In the following, the set of these subframes is called a frame. All PSS/SSS subcarriers may fit into a 100 MHZ component carrier.

Figure 9:
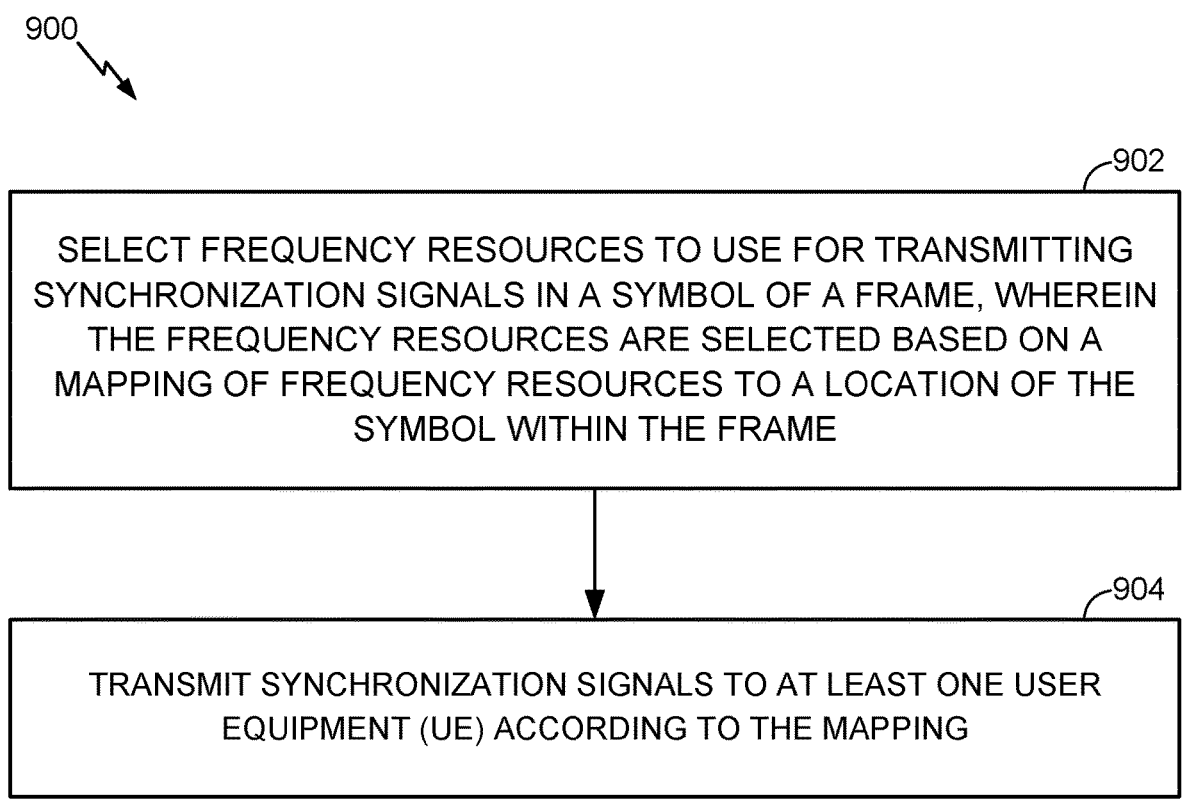
FIG. 9 is an example flow diagram illustrating example operations for location encoding for synchronization signals to convey additional information that may be performed by a base station, in accordance with aspects of the present disclosure.

FIG. 9 is an example flow diagram illustrating example operations 900 for location encoding for synchronization signals to convey additional information, in accordance with aspects of the present disclosure. The operations 900 may be performed, for example, by a base station (e.g., BS 110). The operations 900 may begin, at 902, by selecting frequency resources to use for transmitting synchronization signals (e.g., PSS/SSS) in a symbol of a frame (e.g., one or multiple subframes), wherein the frequency resources are selected based on a mapping of frequency resources to a location of the symbol within the frame. At 904, the BS transmits synchronization signals (e.g., using beamforming) to at least one UE according to the mapping.

According to certain aspects, the additional information to enable the UE to distinguish the symbol may be provided by using location encoding of the synchronization signals (e.g., SSS). For example, the particular frequency resources (e.g., subcarriers) used for transmitting the synchronization signals can be mapped to particular symbols. Thereby, the UE can identify the symbol based on the frequency resources used for the synchronization signals.

For example, in LTE the SSS signal occupies sixty-two (62) subcarriers. For mmW, the SSS can be modified by mapping the 62 subcarriers to a larger set of subcarriers (e.g., 124 subcarriers). Within the larger set of subcarriers that the SSS is mapped to, 62 subcarriers actually containing the SSS sequence are used, while the remaining subcarriers (e.g., 62 remaining in the case of 124 subcarriers) remain empty. The pattern used for transmission of the synchronization signal may indicate the location (e.g., the symbol number) of the synchronization signal within the frame. For example, for each set of four subcarriers in a symbol, two of the subcarriers may be occupied by the synchronization signal and two of the subcarriers may be empty. In this case, there may be six possibilities (e.g., first and second, first and third, first and fourth, second and third, second and fourth, and third and fourth subcarriers may be occupied by the synchronization signal). Thus, location information can be provided for transmission of synchronization signals in six different symbols using this example approach. In aspects, other mappings may be used (e.g., 3 subcarriers of 5 subcarriers occupied by the synchronization signal), so long as the number of subcarriers used for the synchronization signals is mapped to a greater number of subcarriers.

Figure 10:
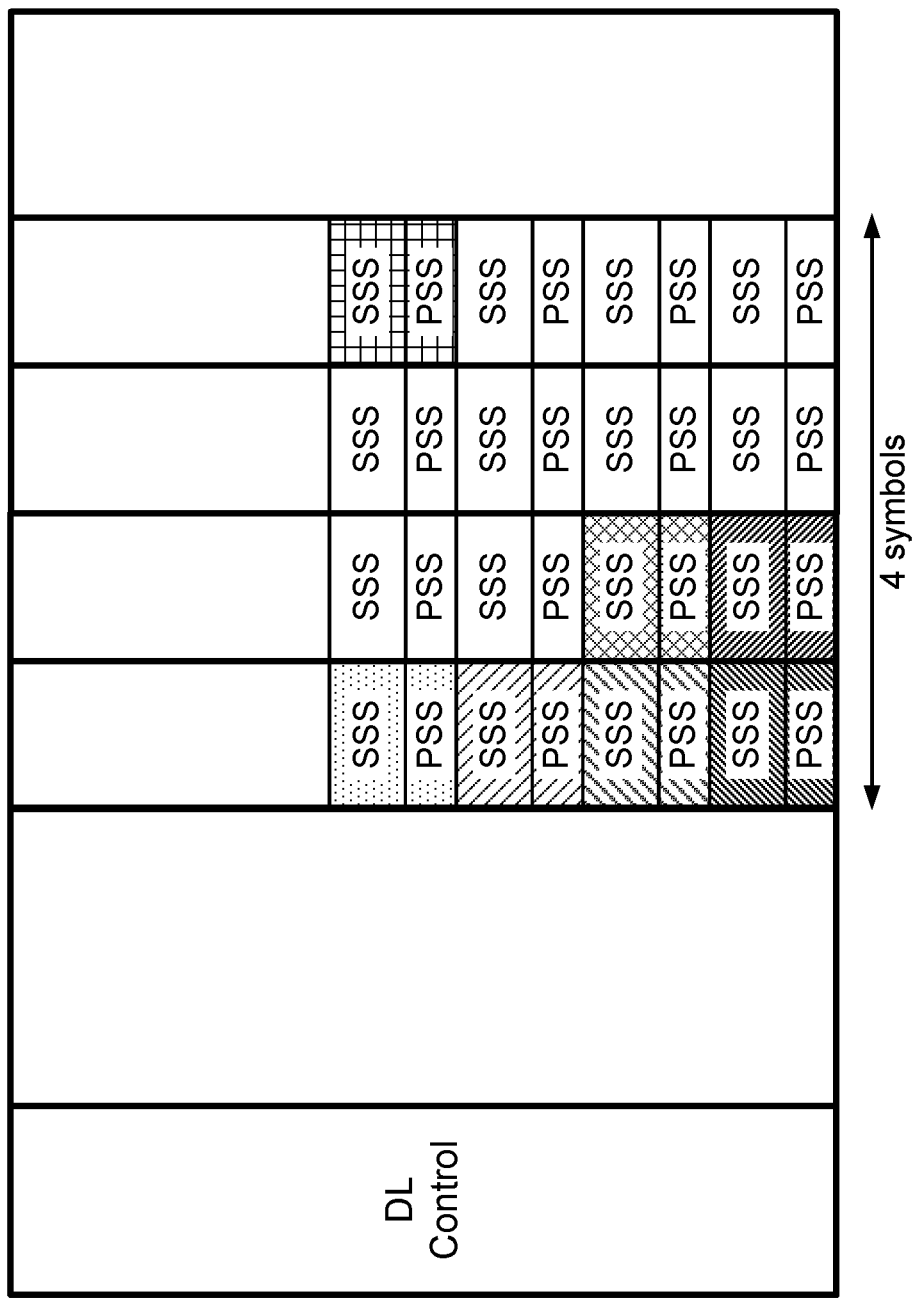
FIG. 10 is an example diagram illustrating a downlink subframe structure, in accordance with certain aspects of the present disclosure.
Figure 10:
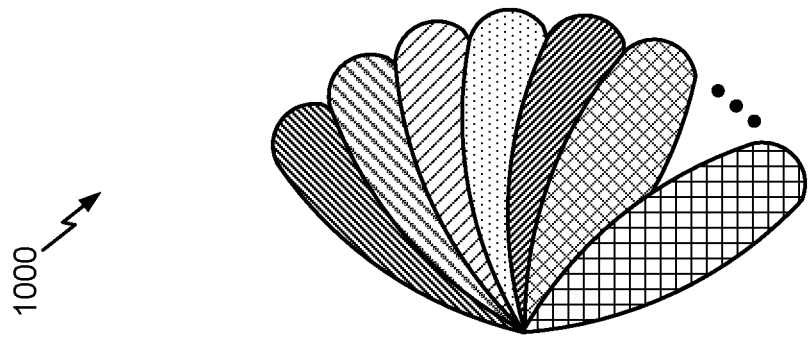

FIG. 10 is an example diagram illustrating at least a portion of a downlink subframe structure 1000, in accordance with certain aspects of the present disclosure. In this example, the frame consists of one subframe. As shown in FIG. 10, PSS/SSS may be transmitted in 4 four symbols according to one example. In each of the four symbols, the PSS/SSS are transmitted four times at various frequencies and with different beamforming. Therefore, as illustrated in FIG. 10, sixteen beams can be accommodated in the frame using this example.

According to certain aspects, the UE may employ blind decoding techniques to identify the mapping of the subcarriers used for synchronization signal transmission to location of the synchronization signal with the frame. The UE may identify the mapping out of an enumerated predefined set of mappings, such that the UE can correlate the mapping to a particular symbol (e.g., the symbol number of the associated symbol).

According to certain aspects, the set of mappings may be based on a function. For example, the set may be defined by $f(2n)=4n+p$ and $f(2n+1)=4n+q$, wherein $0 \leq p < q < 4$ and $n=0 \ldots 31$. Each pair p, q may identify a map; therefore, in this example, there may be 6 mappings in the set, which can be used to distinguish synchronization signals transmitted in six different symbols within a subframe. The UE identifies p and q through blind decodes and maps the found pair onto a symbol number.

According to certain aspects, if physical cell ID (PCI) space of 3*168 subcarriers is used, the SSS symbols may use 62/2*4=124 subcarriers. Altogether the PSS/SSS symbols may use 744 subcarriers.

One benefit of the above mapping is that if the UE tests a hypothesis (p', q') that is not equal to the actual (p, q), the UE will send to the decoder the contents of at least 31 subcarriers, which contain nothing but noise. In this situation, the decoder is likely to declare an invalid SSS sequence, thus, the likelihood of a false positive SSS identification is low.

Figure 11:
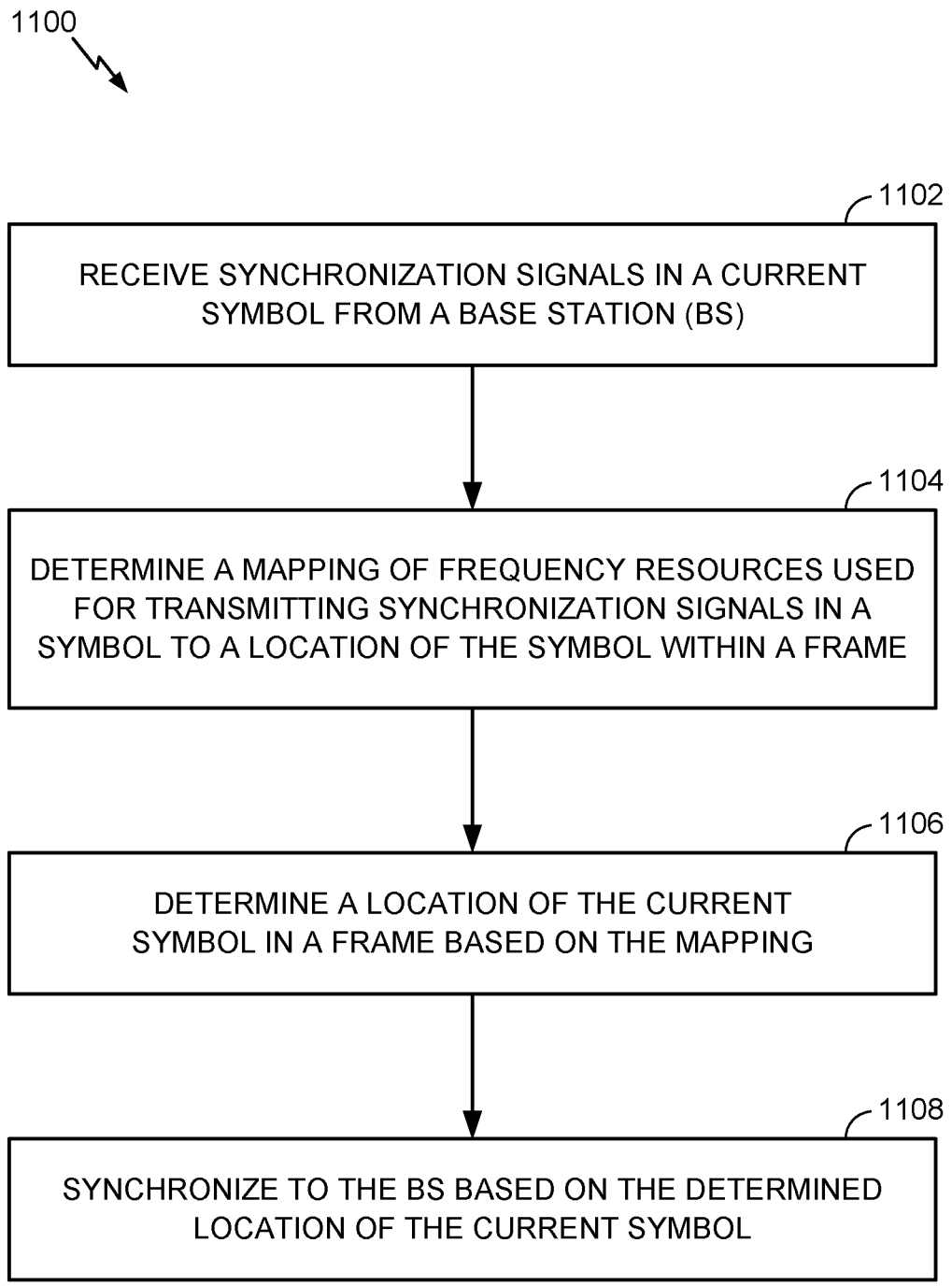
FIG. 11 is an example flow diagram illustrating example operations for synchronizing to a BS based on location encoding for synchronization signals to convey additional information that may be performed by a UE, in accordance with aspects of the present disclosure.

FIG. 11 is an example flow diagram illustrating example operations 1100 for synchronizing to a BS based on location encoding for synchronization signals to convey additional information, in accordance with aspects of the present disclosure. The operations 1100 may be performed, for example, by a UE (e.g., UE 102).

According to certain aspects, the operations 1100 may be complementary operations by a UE to the operations 900 performed by the BS. The operations 1100 may begin, at 1102, by the UE receiving synchronization signals (e.g., beamformed signals) in a current symbol from a BS. At 1104, the UE determines the mapping of frequency resources used for the transmitting synchronization signals (e.g., PSS/SSS) in the current symbol (e.g., a mapping for more than two symbols) to a location of the current symbol within a frame. At 1106, the UE determines the location of the current symbol (e.g., a symbol number) in the frame based on the mapping. At 1108, the UE synchronizes to the BS based on the determined location of the current symbol.

According to certain aspects, once the UE synchronizes to the BS timing, the UE may be able to receive other signals from the BS, for example, such as a physical broadcast channel (PBCH).

According to certain aspects, it may desirable to convey a time divisional multiplexing (TDM) location of the beam. According to certain aspects, the TDM location of the beam can be conveyed via the beam (e.g., according to the techniques described above).

Figure 12:
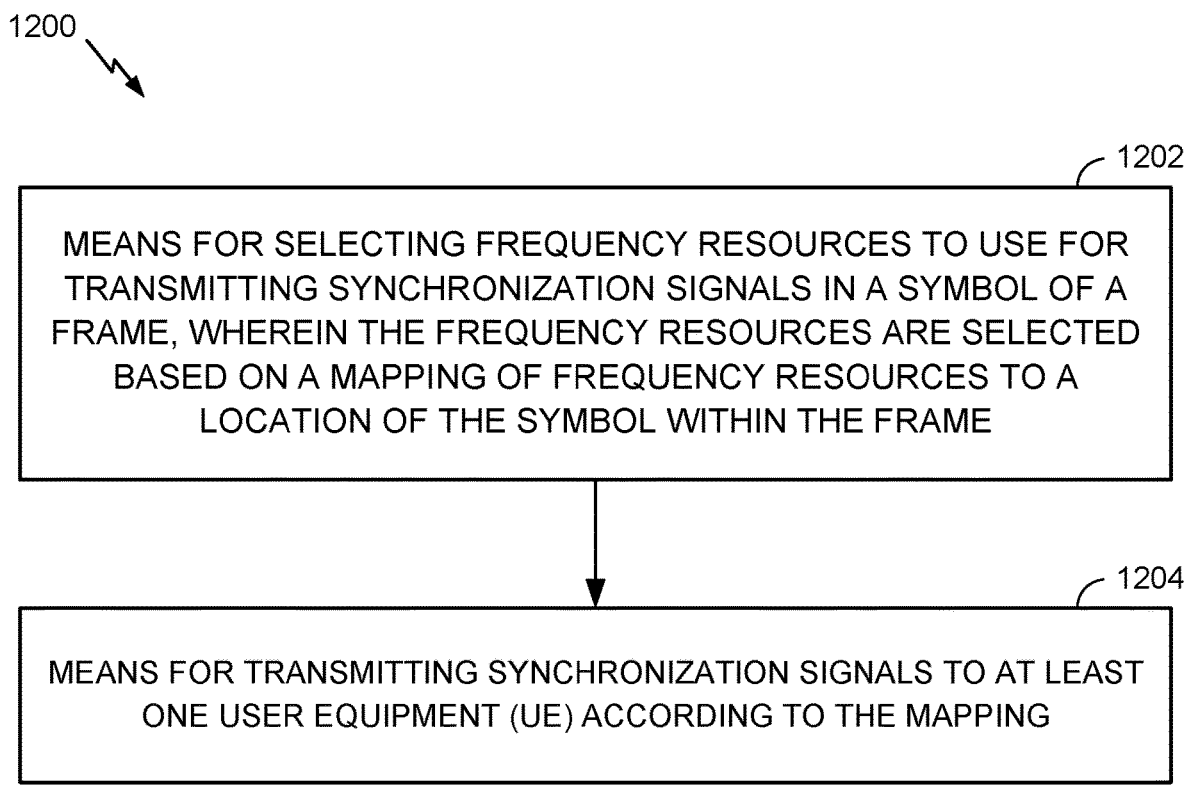
FIG. 12 is a block diagram illustrating example functional components of the BS for performing operations for location encoding for synchronization signals to convey additional information, in accordance with aspects of the present disclosure.

FIG. 12 is a block diagram illustrating example functional components of the BS 1200 (e.g., BS 110) for location encoding for synchronization signals to convey additional information, in accordance with aspects of the present disclosure.

As shown in FIG. 12, the BS 1200 includes means 1202 for selecting frequency resources to use for transmitting synchronization signals (e.g., PSS/SSS) in a symbol of a frame (e.g., one or multiple subframes), wherein the frequency resources are selected based on a mapping of frequency resources to a location of the symbol within the frame. BS 1200 includes means 1204 for transmitting synchronization signals (e.g., using beamforming) to at least one UE according to the mapping.

Figure 13:
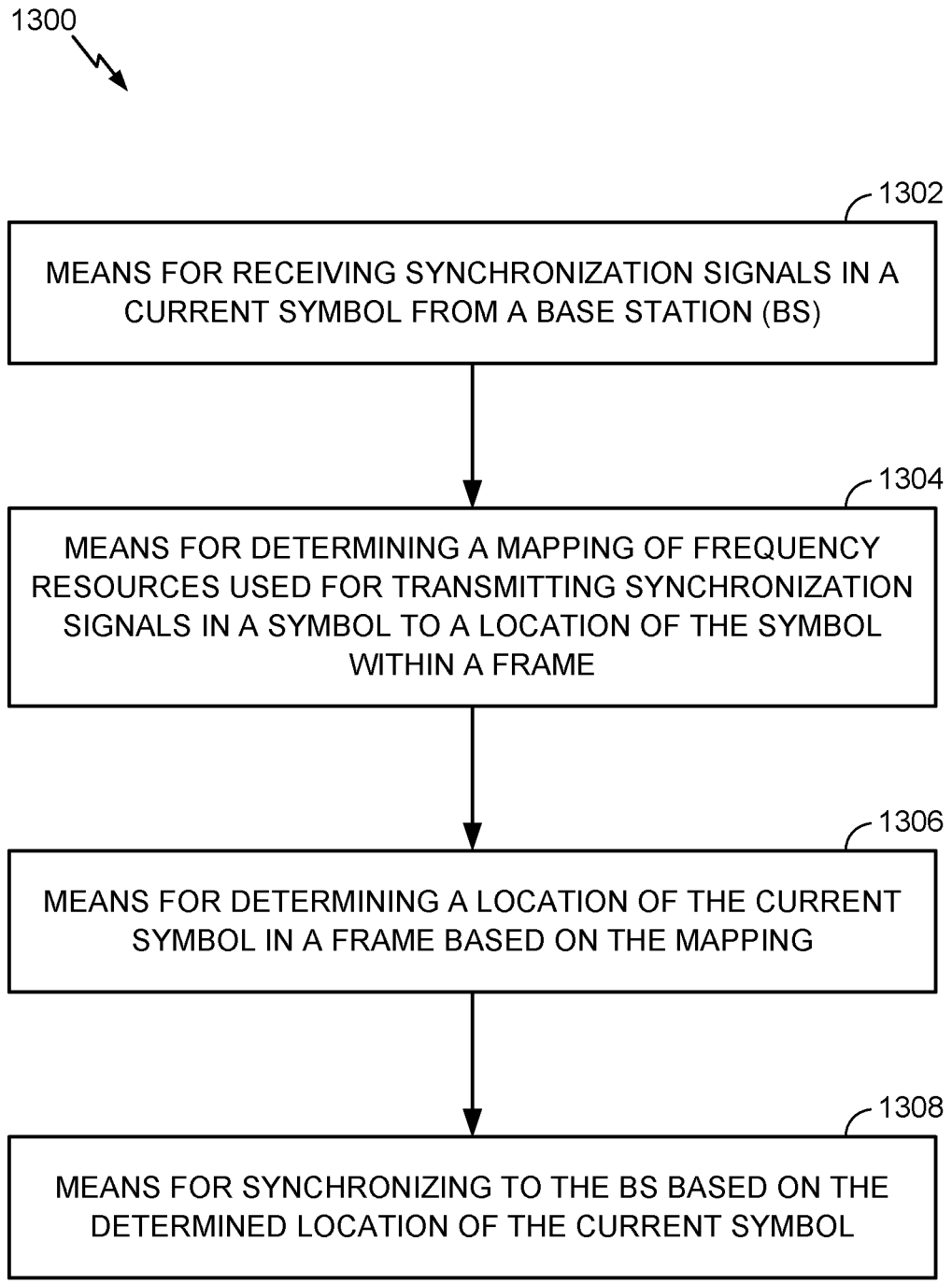
FIG. 13 is a block diagram illustrating example functional components of the UE for performing operations for synchronizing to a BS based on location encoding for synchronization signals to convey additional information, in accordance with aspects of the present disclosure.

FIG. 13 is a block diagram illustrating example functional components of the UE 1300 (e.g., UE 120) for synchronizing to a BS based on location encoding for synchronization signals to convey additional information, in accordance with aspects of the present disclosure. As shown in FIG. 13, the UE 1300 includes means 1302 for receiving synchronization signals (e.g., beamformed signals) in a current symbol from a BS. UE 1300 includes means 1304 for determining the mapping of frequency resources used for the transmitting synchronization signals (e.g., PSS/SSS) in the current symbol (e.g., a mapping for more than two symbols) to a location of the current symbol within a frame. UE 1300 includes means 1306 for determining the location of the current symbol (e.g., a symbol number) in the frame based on the mapping. UE 1300 includes means 1308 for synchronizing to the BS based on the determined location of the current symbol.

The techniques and apparatus described above for location encoding of synchronization signals to convey additional information may help UEs to synchronize to the eNB timing in a mmW system where the beamformed PSS/SSS may be sent in a plurality of symbols (e.g., greater than two symbols) in a frame.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for determining, means for performing, means for transmitting, means for receiving, means for sending, means for signaling, means for selecting, means for synchronization, means for identifying, and/or means for communicating may include one or more processors or other elements, such as the transmit processor 264, the controller/processor 280, the receive processor 258, and/or antenna(s) 252 of the user equipment 120 illustrated in FIG. 2, and/or the transmit processor 220, the controller/processor 240, and/or antenna(s) 234 of the base station 110 illustrated in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a wireless node (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a wireless node and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless node and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a base station (BS), comprising:
    selecting frequency resources to use for transmitting signals to at least one user equipment (UE), the frequency resources being selected based on a predefined association of frequency resources to locations of symbols, wherein the selected frequency resources comprises a first portion to use for transmitting one or more synchronization signals in one or more symbols, the first portion comprising a number of selected frequency resources less than a total number of the selected frequency resources; and transmitting the signals to the at least one UE using the selected frequency resources, the selected frequency resources being indicative, to the at least one UE, of the locations of the one or more symbols of the one or more synchronization signals within a frame of the signals.

2. The method of claim 1, wherein the one or more synchronization signals are transmitted using beamforming.

3. The method of claim 2, wherein:
the one or more synchronization signals comprise multiple synchronization signals which are transmitted at different frequency locations in the same one or more symbols; and
the multiple synchronization signals are transmitted using different beamforming parameters in different symbols.

4. The method of claim 1, wherein the one or more synchronization signals comprise at least one of: secondary synchronization signals (SSS) or primary synchronization signals (PSS).

5. The method of claim 1, wherein the association is determined for at least three symbols in the frame.

6. The method of claim 1, wherein the selected frequency resources comprise non-contiguous subcarriers.

7. The method of claim 1, wherein the one or more synchronization signals comprise an indication of a cell identification.

8. The method of claim 1, wherein selecting the frequency resources based on the predefined association of frequency resources to locations of symbols comprises performing location encoding of the one or more synchronization signals.

9. The method of claim 1, wherein selecting the frequency resources based on the predefined association of frequency resources to locations of symbols comprises selecting a subcarrier pattern, from a set of subcarrier patterns, for transmitting the one or more synchronization signals, and wherein each subcarrier is associated with a symbol number.

10. The method of claim 9, wherein:
the one or more synchronization signals includes a secondary synchronization signal (SSS),
the SSS occupies 62 subcarriers, and
each subcarrier pattern is associated with 124 subcarriers and indicates a pattern of 62 occupied subcarriers and 62 unoccupied subcarriers of the 124 subcarriers.

11. A method for wireless communications by a user equipment (UE), comprising:
receiving one or more synchronization signals on frequency resources in one or more symbols within a frame from a base station (BS), wherein a portion of the received frequency resources are empty of a synchronization signal;
determining locations of the one or more symbols of the one or more synchronization signals within the frame based on a predefined association of the frequency resources received to the locations of the one or more symbols within the frame, wherein the determining of the locations comprises:
determining subcarriers on which the one or more synchronization signals are received in the one or more symbols; and
identifying symbol numbers of the one or more symbols associated with the subcarriers; and
synchronizing to the BS based on the determined locations of the one or more symbols.

12. The method of claim 11, wherein the one or more synchronization signals are transmitted using beamforming.

13. The method of claim 12, wherein:
the one or more synchronization signals comprise multiple synchronization signals which are transmitted at different frequency locations in the same one or more symbols; and
the multiple synchronization signals are transmitted using different beamforming parameters in different symbols.

14. The method of claim 11, wherein the one or more synchronization signals comprise at least one of: secondary synchronization signals (SSS) or primary synchronization signals (PSS).

15. The method of claim 11, wherein the association is determined for at least three symbols in the frame.

16. The method of claim 11, wherein determining the locations of the one or more symbols within the frame based on the association further comprises
performing blind decoding of the one or more synchronization signals to determine the subcarriers on which the one or more synchronization signals are received in the one or more symbols.

17. The method of claim 11, wherein the one or more synchronization signals comprise an indication of a cell identification.

18. An apparatus for wireless communications by a base station (BS), comprising:
means for selecting frequency resources to use for transmitting signals to at least one user equipment (UE) the frequency resources being selected based on a predefined association of frequency resources to locations of symbols, wherein the selected frequency resources comprises a first portion to use for transmitting one or more synchronization signals in one or more symbols, the first portion comprising a number of selected frequency resources less than a total number of the selected frequency resources; and
means for transmitting the signals to the at least one UE using the selected frequency resources, the selected frequency resources indicating, to the at least one UE, the locations of the one or more symbols of the one or more synchronization signals within a frame of the signals.

19. The apparatus of claim 18, wherein the one or more synchronization signals are transmitted using beamforming.

20. The apparatus of claim 19, wherein:
the one or more synchronization signals comprise multiple synchronization signals which are transmitted at different frequency locations in the same one or more symbols; and
the multiple synchronization signals are transmitted using different beamforming parameters in different symbols.

21. The apparatus of claim 18, wherein the one or more synchronization signals comprise at least one of: secondary synchronization signals (SSS) or primary synchronization signals (PSS).

22. The apparatus of claim 18, wherein the association is determined for at least three symbols in the frame.

23. The apparatus of claim 18, wherein the selected frequency resources comprise non-contiguous subcarriers.

24. The apparatus of claim 18, wherein the one or more synchronization signals comprise an indication of a cell identification.

25. An apparatus for wireless communications by a user equipment (UE), comprising:
means for receiving one or more synchronization signals on frequency resources in one or more symbols within a frame from a base station (BS), wherein a portion of the received frequency resources are empty of a synchronization signal;

means for determining locations of the one or more symbols of the one or more synchronization signals within the frame based on a predefined association of the received frequency resources to the locations of the one or more symbols within the frame, wherein the means for determining locations comprises:

means for determining subcarriers on which the one or more synchronization signals are received in the one or more symbols; and means for identifying symbol numbers of the one or more symbols associated with the subcarriers; and means for synchronizing to the BS based on the determined locations of the one or more symbols.

26. The apparatus of claim 25, wherein the one or more synchronization signals are transmitted using beamforming.

27. The apparatus of claim 26, wherein:

the one or more synchronization signals comprise multiple synchronization signals are transmitted at different frequency locations in the same one or more symbols; and the multiple synchronization signals are transmitted using different beamforming parameters in different symbols.

28. The apparatus of claim 25, wherein the one or more synchronization signals comprise at least one of: secondary synchronization signals (SSS) or primary synchronization signals (PSS).

29. The apparatus of claim 25, wherein the association is determined for at least three symbols in the frame.

30. The apparatus of claim 25, wherein the one or more synchronization signals comprise an indication of a cell identification.

* * * * *